June 29, 1971 C. GUERRINI 3,588,938
LEADING END FITTING FOR SEWER CLEANING RODS AND THE LIKE
Filed Dec. 26, 1968
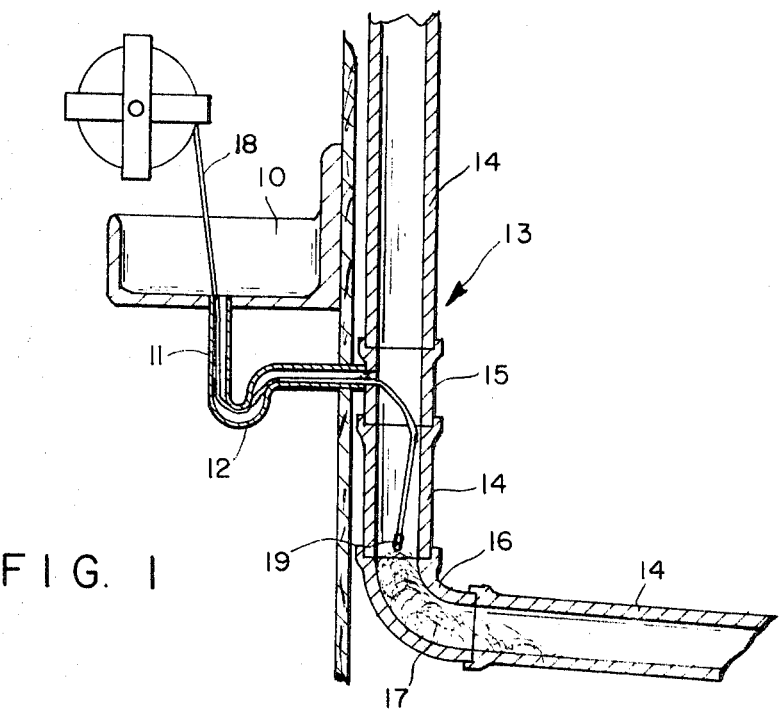
FIG. 1
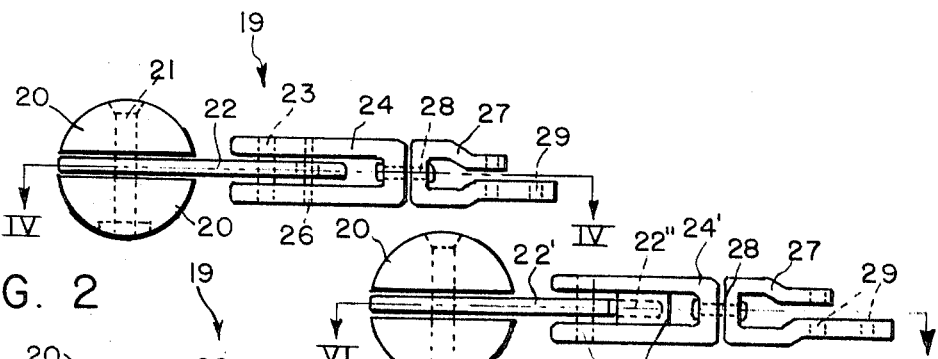
FIG. 2
FIG. 5
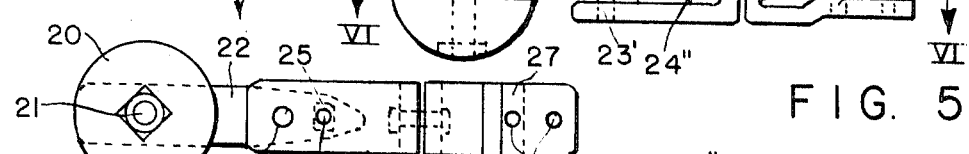
FIG. 3
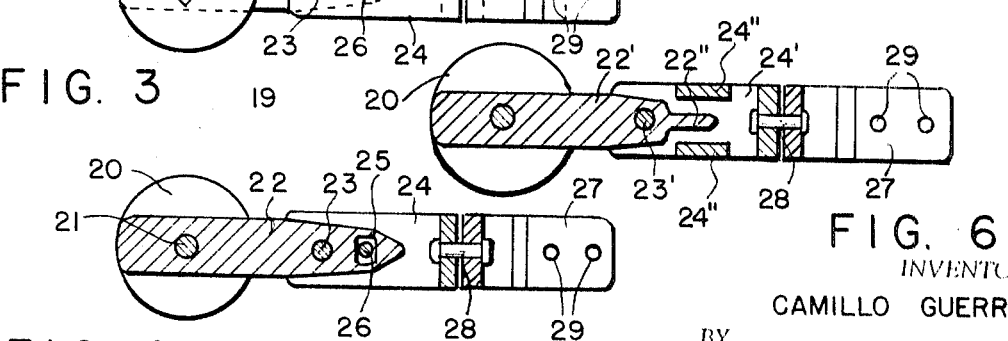
FIG. 4
FIG. 6
INVENTOR.
CAMILLO GUERRINI
BY
Peter L. Klempay
AGENT Patented June 29, 1971

3,588,938
LEADING END FITTING FOR SEWER CLEANING
RODS AND THE LIKE
Camillo Guerrini, R.D. 2, Greenville, Pa. 16125
Filed Dec. 26, 1968, Ser. No. 787,131
Int. Cl. B08b 9/02
U.S. Cl. 15—104.3                               2 Claims

ABSTRACT OF THE DISCLOSURE

Disclosed in the following specification is an improved end fitting for a sewer cleaning rod or "plumber's snake." A pair of hemispherical rollers are mounted for free rotation about their common axis and with their flat faces toward one another. The shaft which carries these rollers is mounted at one end of a link which is in turn carried by a U-shaped member and is free to pivot through a limited arc with respect to the U-shaped member. The closed end of the U-shaped member is attached to the end of the flexible rod or "snake" by a connection which allows the end fitting to swivel freely about the axis of the flexible rod.

---

This invention relates to sewer cleaning tools, commonly known as "plumber's snakes," and more particularly to an improved leading end fitting for such tools.

Sanitary sewers such as those from sinks, wash basins, and the like frequently become clogged due either to the accumulation of fats, grease, and other solids on the pipe walls or to the trapping of foreign objects such as wash cloths at bends in the piping. An expedient and common method of cleaning such clogged plumbing is to force a long flexible rod into the sewer pipe above the obstruction, scraping the accumulated solids free of the pipe walls and forcing any obstructions into the larger diameter portions of the plumbing where they are readily flushed from the system. Presently employed cleaning rods or "snakes" tend to snag on rough portions of the pipe walls and at joints in the pipes. When this occurs, it is frequently impossible to force the rod beyond the obstruction and to clear the blockage of the sewer. Likewise, the present cleaning rods can be forced through tight bends in the piping only with great difficulty and, if excessive force is applied, may puncture the pipe wall necessitating inconvenient and costly repairs involving the ripping up of walls and floors to replace the damaged pipe. Further, the presently used rods do not adequately remove the deposits from the pipe walls thus permitting the rapid buildup of such deposits and subsequent blockage.

It is the primary object of my invention to provide an improved fitting for the leading end of a sewer cleaning rod which may be easily run through a sewer line in spite of rough or stepped portions of the line. It is also an object of my invention to provide an end fitting which enables the cleaning rod to move through tight bends in the pipe without the risk of damage to the pipe walls. A further object of my invention is to provide an improved end fitting for a cleaning rod which readily removes the deposits from the sewer walls. Also, it is an object of the invention to provide and end fitting which is of economical and rugged construction and which is capable of providing trouble-free operation.

The above and other objects and advantages of my invention will become apparent upon consideration of the following specification and the accompanying drawing wherein there is disclosed a preferred embodiment of my invention.

In the drawing:

FIG. 1 is an elevational, sectional view of a sewer line showing the use of a sewer cleaning rod equipped with the device of my invention;

FIG. 2 is an elevational view, in an enlarged scale, of the end fitting shown in FIG. 1;

FIG. 3 is a plan view of the end fittting of my invention;

FIG. 4 is a sectional view taken along the line IV—IV of FIG. 2;

FIG. 5 is an elevational view of a modified form of the end fitting of my invention; and FIG. 6 is a sectional view taken along the line VI—VI of FIG. 5.

Referring first to FIG. 1, there is shown a sink 10 connected to a drain 11 having a U-bend 12 and connected, in turn, to a sewer line 13, all in accordance with conventional practice. The sewer line 13 may be constructed of lengths of cast iron, vitreous clay, or plastic pipe 14 with connecting fittings 15 and elbows 16. Deposits of fats and other solids washed into the sewer line 13 may accumulate on the inner walls of the sewer line 13 or foreign objects such as wash cloths which are accidently washed into the sewer line may become caught at bends in the line or snagged on projections between the various pipe lengths comprising the sewer line 13. In either event, a blockage such as shown at 17 may occur in the sewer line 13, obstructing the free passage of wastes and fluids through the line. An expedient method of freeing the sewer line 13 of such obstructions is to force a long, flexible rod 18 into the sewer line to scrape any deposits from the inner walls of the sewer line 13 or to force any solid objects trapped in the line free to a position where they can be flushed from the line 13 by a flow of water. In order to more easily guide the flexible rod 18 through the sewer lines 13 and to prevent the rod from snagging on rough portions of the sewer line 13 such as may occur at joints between the various sections comprising the line and to prevent the leading end of the rod 18 from puncturing the side walls of the sewer line 13, I provide an improved guiding fitting 19 for the leading end of the flexible rod 18. As shown in FIGS. 2, 3, and 4, the leading end fitting 19 of my invention comprises a pair of hemispherical rollers 20 positioned with their flat faces towards one another and free to rotate about a bolt or pin 21 extending through the rollers 20 normal to their flat faces. The pin 21 is carried by one end of a link 22 which is pivotally connected at its other end by means of a pin 23 to the open end of a bifurcated member 24. The link 22 is also provided at its second end with a slot 25 and the bifurcated member 24 is provided with a pin 26 which extends through the slot 25 of the link 22. This arrangement permits the link 22 to pivot about the pin 23 through only a limited arc. The bifurcated member 24 is connected at its closed end to a mounting member 27 by means of a pin or rivet 28 in such manner that the bifurcated member 24 is free to rotate about the axis of the pin 28. The mounting member 27 is provided with suitable holes 29 for attaching the end fitting 19 to the end of the flexible rod 18.

In the embodiment shown in FIGS. 5 and 6, the link 22' which carries the hemispherical rollers 20 is pivotally connected by means of a pin 23' to the open ends of a bifurcated member 24'. The inner end of the link 22' is provided with a finger 22" and the bifurcated member 24' is provided with a pair of stops 24" extending between the legs of the member 24' and positioned adjacent the finger 22".

When the flexible rod or "snake," in passing through a sewer line, encounters a sharp bend in the sewer line or a projection of the wall of the sewer line, the rollers 20 and the link 22 are pivoted about the pin 23 to permit the rollers to move around the bend or over the obstruction. If the bend is sufficiently tight or the obstruction sufficiently large, the rollers 20 and link 22 are pivoted to their full extent as determined by the slot 25 and pin 26 or by the finger 22" and the stops 24". Any further attempt of the rollers to deflect is imparted to the bifurcated member 24 as well as to the rollers 20 and the link 22. The bifurcated member 24 may now revolve about the pin 28. The combination of the revolving of the rollers 20, the limited pivoting of the link 22, and the swivelling of the bifurcated member 24 serves to guide the end of the flexible rod 18 around any sharp bends in the plumbing system and around projections in the walls of the sewer line 13. Because of this combination of actions no potentially damaging forces are exerted on the walls of the sewer line even at the locations of tight bends or of rough portions at the joints between the various pipes. The rollers 20 also serve, when being forced through a sewer line, to scrape deposits from the sewer walls thus aiding in the cleaning of the sewer pipes.

It will now be apparent that I have provided a new and improved end fitting for a sewer cleaning rod which is effective in guiding the rod even through areas of a sewer line having tight curves and which eliminates the danger of puncturing the side walls of the sewer lines. It will also be apparent that I have provided a new end fitting for a sewer cleaning rod which is of simple, economical construction, and which may be readily adapted for use on existing sewer cleaning rods without extensive modification thereof.

I claim:
1. A leading end fitting for a sewer cleaning rod, comprising:
   a bifurcated member connected to and projecting from the end of the sewer cleaning rod;
   a link pivotally connected intermediate its ends to the ends of the leg portions of the bifurcated member for rotation about an axis perpendicular to the axis of the sewer cleaning rod, the portion of the link between the leg portions of the bifurcated member having a slot;
   a pin connected to the leg portions of the bifurcated member and extending through the slot of the link to limit rotation of the link; and
   a pair of hemispherical rollers mounted in back-to-back relation on opposite sides of the link at the free end thereof, the rollers being free to rotate about an axis parallel to the axis of rotation of the link.

2. A leading end fitting for a sewer cleaning rod, comprising:
   a bifurcated member connected to and projecting from the end of the sewer cleaning rod;
   a link pivotally connected intermediate its ends to the ends of the leg portions of the bifurcated member for rotation about an axis perpendicular to the axis of the sewer cleaning rod, the portion of the link between the leg portions of the bifurcated member having a finger-like projection;
   a pair of stop members secured to the leg portions of the bifurcated member on opposite sides of the finger-like projection of the link to limit rotation of the link; and
   a pair of hemispherical rollers mounted in back-to-back relation on opposite sides of the link at the free end thereof, the rollers being free to rotate about an axis parallel to the axis of rotation of the link.

References Cited
UNITED STATES PATENTS

| | | | |
|---|---|---|---|
| 1,151,357 | 8/1915 | Grosvold | 15—104.3Sn |
| 1,978,957 | 10/1934 | Pardieck | 15—104.3Sn |
| 3,064,293 | 11/1962 | Berry | 15—104.14X |

FOREIGN PATENTS

| | | | |
|---|---|---|---|
| 676,492 | 12/1963 | Canada | 15—104.3Sn |

EDWARD L. ROBERTS, Primary Examiner

U.S. Cl. X.R.
15—104.14